(12) United States Patent
Jolivet

(10) Patent No.: US 9,801,046 B2
(45) Date of Patent: Oct. 24, 2017

(54) METHOD AND APPARATUS FOR CONNECTING WITH A NETWORK, BY A TERMINAL, IN WIRELESS COMMUNICATION

(71) Applicant: LG ELECTRONICS INC., Seoul (KR)

(72) Inventor: Paul Jolivet, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/272,065

(22) Filed: Sep. 21, 2016

(65) Prior Publication Data

US 2017/0086058 A1 Mar. 23, 2017

Related U.S. Application Data

(60) Provisional application No. 62/222,178, filed on Sep. 22, 2015.

(51) Int. Cl.
*H04W 4/00* (2009.01)
*H04W 8/18* (2009.01)
*H04W 8/20* (2009.01)

(52) U.S. Cl.
CPC ............ *H04W 8/183* (2013.01); *H04W 8/205* (2013.01)

(58) Field of Classification Search
None
See application file for complete search history.

(56) References Cited

U.S. PATENT DOCUMENTS

2015/0133196 A1* 5/2015 Sen .................. H04W 8/183
455/558

* cited by examiner

*Primary Examiner* — Idowu O Osifade
(74) *Attorney, Agent, or Firm* — Dentons US LLP

(57) ABSTRACT

A method and apparatus for connecting with a network in a wireless communication system is provided. A terminal caches information on a previous session before switching off the terminal, synchronizes information on a current session with information on the previous session after switching on the terminal, and connects with the network by using the information on the current session.

14 Claims, 7 Drawing Sheets

METHOD AND APPARATUS FOR CONNECTING WITH A NETWORK, BY A TERMINAL, IN WIRELESS COMMUNICATION

CROSS-REFERENCE TO RELATED APPLICATIONS

This application claims the benefit of priority of U.S. Provisional application No. 62/222,178, filed on Sep. 22, 2015, which is incorporated by reference in its entirety herein.

BACKGROUND OF THE INVENTION

Field of the Invention

The present invention relates to wireless communications, and more particularly, to a method and apparatus for optimizing terminal initialization in a wireless communication system.

Related Art $3^{rd}$ generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

A current initialization process of a terminal when the terminal is switched on may include multiple times of checks and synchronizations. For example, the current initialization process of the terminal may include an identification process (e.g. personal identification number (PIN) verification), an synchronization process of essential data (e.g. session keys, information necessary for accessing correct network), and a transmission process of essential data (e.g. phonebook, messages stored on the subscriber identification module (SIM)/universal SIM (USIM), user preferences . . . ). Due to the multiple times of checks and synchronizations in addition to the boot time of the operating system, the overall boot time may take a long time which may seriously impact the user experience.

Various items have been discussed in order to reduce the overall boot time of the terminal. Among the various items, it is difficult to optimize network research and connection process more than it is without considering protocols updates. However, there may be plenty of room for optimization in processes related to a universal integrated circuit card (UICC). For example, the data not to be used for accessing network may be unnecessary before accessing the network. For another example, if the terminal was has been used with the same SIM/USIM, it may be unnecessary to reload data that can be stored in the terminal. That is, when the terminal is switched on and terminal initialization process is performed in the UICC, optimization may be possible.

SUMMARY OF THE INVENTION

The present invention provides a method and apparatus for optimizing terminal initialization in a wireless communication system. The present invention provides a method and apparatus for optimizing terminal power up and a universal integrated circuit card (UICC) initialization.

In an aspect, a method for connecting with a network by a terminal in a wireless communication system is provided. The method includes caching information on a previous session before switching off the terminal, synchronizing information on a current session with information on the previous session after switching on the terminal, and connecting with the network by using the information on the current session.

In another aspect, a terminal in a wireless communication system is provided. The terminal includes a memory, a transceiver, a universal integrated circuit card (UICC), and a processor coupled to the memory, the transceiver and the UICC. The processor caches information on a previous session in the memory before switching off the terminal, synchronizes information on a current session with information on the previous session after switching on the terminal, and connects with the network by using the information on the current session.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advanced (LTE-A) is an evolution of the 3GPP LTE.

For clarity, the following description will focus on the LTE-A. However, technical features of the present invention are not limited thereto.

Figure 1:
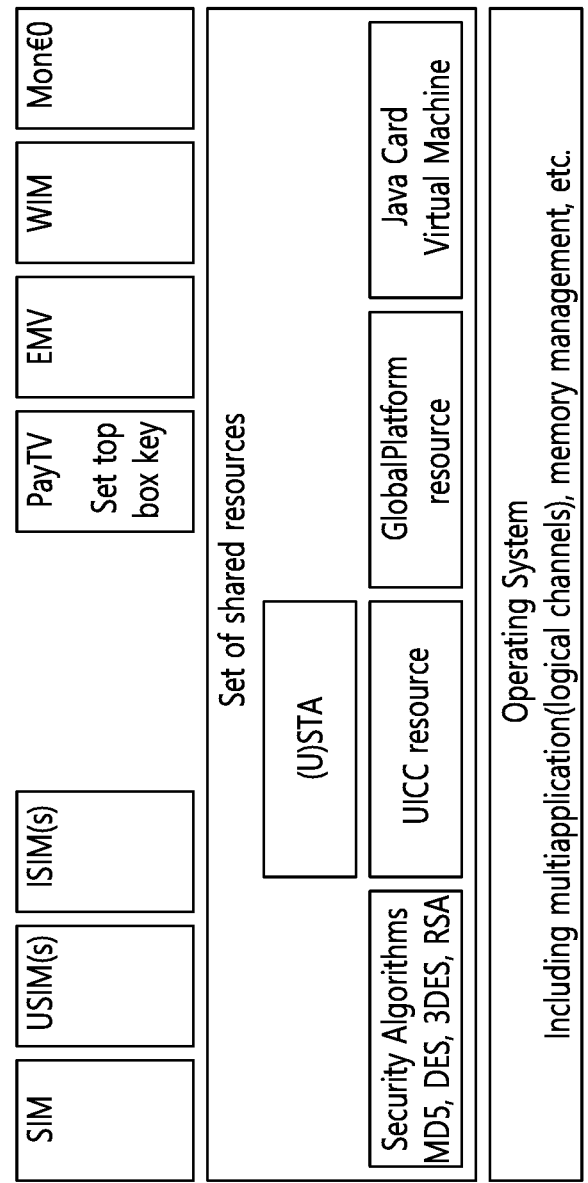
FIG. 1 shows an example of a UICC architecture.

FIG. 1 shows an example of a UICC architecture. A universal integrated circuit card (UICC) is a smart card platform as defined by the European telecommunications standards institute (ETSI) smart card platform (SCP) technical committee. It is designed to provide security and services to any application. Historically, this platform came out of the telecommunication subscriber identification module (SIM) card, however, it may be used simultaneously for multiple other applications, including banking, e-purses, health, transportation, etc. The architecture shown in FIG. 1 shows how applications are based on the common resources of the UICC. The UICC resources are based on international organization for standardization/international electrotechnical commission (ISO/IEC) 7816 series specifications, enhanced by ETSI SCP specific features. Applications are developed on top of this platform by different technical committees, including 3GPP for SIM or Universal SIM (USIM), etc., EMVCo for financial applications, governments for health cards, or various services providers for transportation applications, e-purses, etc.

Hereinafter, the UICC refers to a SIM or a USIM. That is, UICC, SIM or USIM may be used mixed with each other in the description below.

Figure 2:
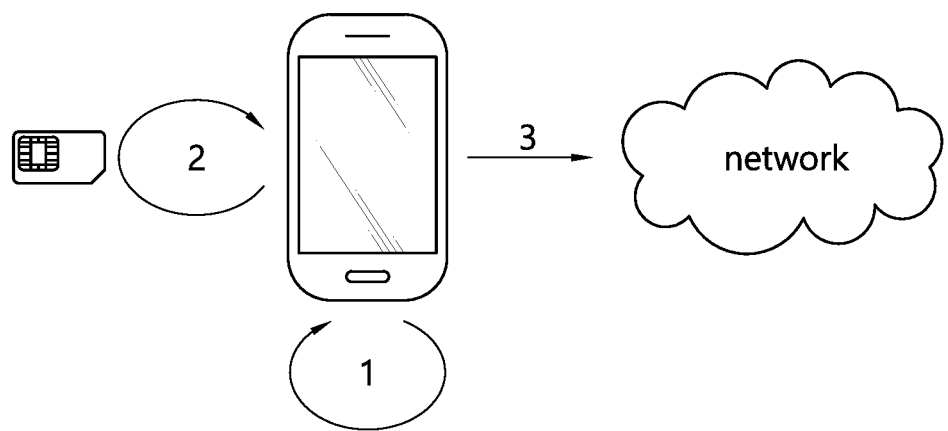
FIG. 2 shows a current booting procedure.

FIG. 2 shows a current booting procedure. The overall booting procedure may be as follows.

(1) When the terminal is powered on, the terminal boots its operating system (e.g. Android), some applications and various hardware elements required to access the network. Thereafter, the terminal may consider to access network.

(2) The terminal may perform user identification by using personal identification number (PIN) code. Thereafter, the terminal loads all information stored in the SIM/USIM, before accessing the network. All information loaded from the SIM/USIM may be stored in the terminal during the whole session (i.e. after power on and before power off) and may replace any information previously stored in the terminal. Actually, the operator may expect that the terminal clears all memory for security reasons, after power off or shutdown due to lack of power, in order to avoid that someone is able to recover data from an original user when getting the lost/stolen phone.

(3) After loading all information from the SIM/USIM, the terminal establishes a connection with the network. As long as everything has been initiated, the terminal, which is authenticated in the network, may register to the network, get session keys from the network and access mobile service (phone call, internet connection, etc.) with network.

Figure 3:
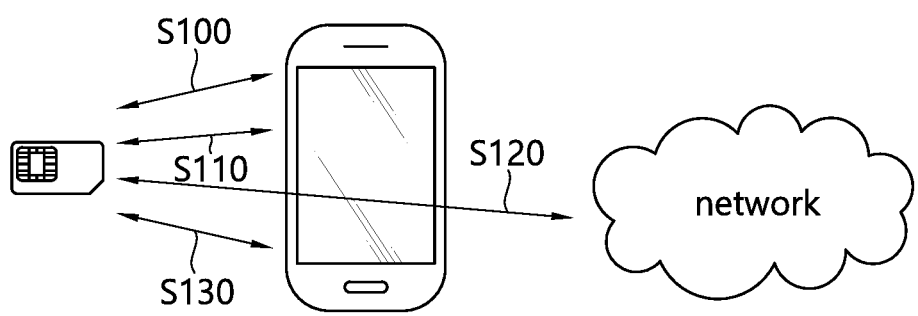
FIG. 3 shows a current SIM/USIM booting process.

FIG. 3 shows a current SIM/USIM booting process. FIG. 3 shows a detailed description of terminal initialization process which is shown in (2) in FIG. 2. The terminal initialization process may be split into sub-procedures as follows.

In step S100, the terminal may identify the user by verifying the PIN code between the SIM/USIM and the terminal. This user identification procedure may be disabled by the user. Accordingly, the user may deactivate the PIN code presentation. However, there is a possibility that the terminal may store the PIN code in the memory in order to be able to reboot the SIM/USIM transparently, e.g. to reinstall important upgrades or in case of unexpected failure. In this case, when the terminal is powered off, the PIN code stored in the memory should be deleted so that if the user switches off the terminal, the PIN code will be requested at power on (unless deactivated).

In step S110, the terminal loads all mobile subscription context, including connection information, users' preferences, subscription's data, network access information and/or user's personal data, from the SIM/USIM. This step consists of getting information on network connection and service access from the SIM/USIM. That is, information which is unnecessary for accessing the network may be loaded from the SIM/USIM.

In step S120, the authentication process may be initiated with the network.

In step S130, additionally in some cases, sessions may be initiated for some data or application between the terminal and the SIM/USIM.

Considering the current terminal initialization process shown in FIGS. 2 and 3, a problem related to a bad user experience may occur when the terminal is powered on. That is, the booting time of the terminal may take significantly long time, sometimes a few minutes, between pushing the power button of the terminal and accessing the network, and even worse, to make a call. This situation may happen oftentimes, since multiple additions have been made to the standard aiming at enhancing service, without caring about the side effect of the accumulation of steps in the terminal initialization process.

Meanwhile, the terminal may be switched on with the SIM/USIM, which is the exact same SIM/USIM with the terminal has been switched off. In this case, fully reloading the information from the SIM/USIM, as in step S110 in FIG. 3, may be unnecessary and costly in terms of performance and efficiency. Accordingly, the terminal initialization process may be optimized to reorder and prioritize the processes so that the impact on both user experience and service is acceptable. It may be considered to focus first on essential data to access network and service, and then, after connection, the remaining information may be loaded. Thus, a synchronization mechanism between the terminal and the SIM/USIM may significantly enhance the user experience by reducing the booting time to access at least minimum service.

Hereinafter, a method for optimizing a terminal initialization process is proposed according to an embodiment of the present invention. More specifically, the present invention focuses on optimizing the second phase of the terminal initialization process, i.e. step S110 in FIG. 3, which is related to the use of the SIM/USIM. The present invention proposes at least one of postponing any non-essential process to later (i.e. after connecting to the network) or simply removing any unnecessary process. The present invention provides caching information securely in the terminal and synchronizing information with the SIM/USIM, rather than reloading information from the SIM/USIM at every new session. According to the present invention, at the first attempt, only essential information for accessing the network may be synchronized. Then, if needed, further synchronization may be done as soon as the terminal is connected with the network, offering to user the best available service.

The present invention aims at reducing the delay in the connection process significantly by using the synchronization mechanism between the terminal and the SIM/USIM. The present invention does not prevent any further inventions that may further reduce the delay in the connection process by acting on other prioritizations on the terminal. Further, security cannot be impacted by the synchronization mechanism.

Figure 4:
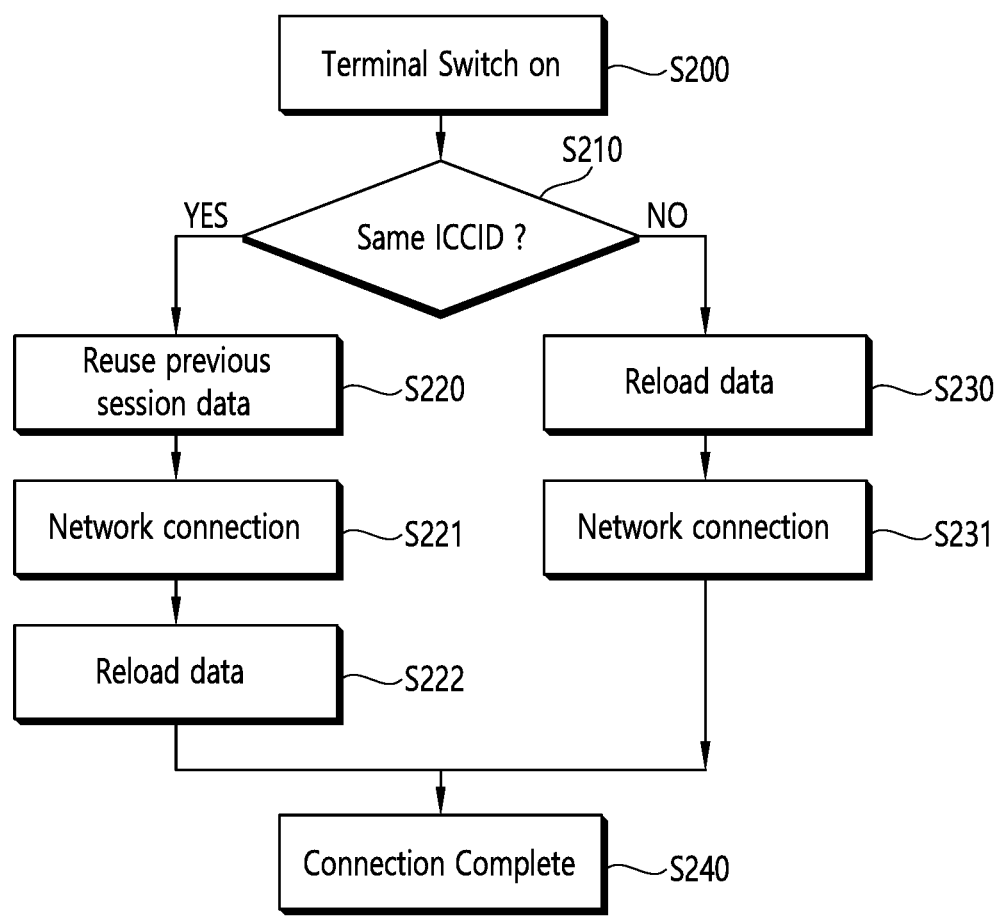
FIG. 4 shows a method for optimizing a terminal initialization process according to an embodiment of the present invention.

FIG. 4 shows a method for optimizing a terminal initialization process according to an embodiment of the present invention. In this embodiment, the terminal checks if the SIM/USIM has been changed, e.g. by checking a flag in the SIM/USIM.

At first, when the terminal is switched off, information stored in the last used SIM/USIM may be stored in the terminal. That is, information stored in the last used SIM/USIM may be cached in the terminal. In order to be able to reuse information on the previous session, i.e. not to reload all information from the current SIM/USIM, all needed information shall be cached in the terminal. This has to be done in a secure way so that user cannot cheat and update this information. Among the security feature that may help, signing the whole content may significantly reduce the risk that user tries to modify his profile.

In step S200, the terminal is switched on, and in step S210, the terminal checks if the SIM/USIM has been changed by checking an integrated circuit card identity (ICCID) of the SIM/USIM. The SIM/USIM may easily be identified by the ICCID, which is the unique serial number of the SIM/USIM. That is, if the ICCID of the previously used SIM/USIM and the ICCID of the current used SIM/USIM are identical with each other, the terminal may determine that the SIM/USIM has not been changed. Otherwise, i.e. if the ICCID of the previously used SIM/USIM and the ICCID of the current used SIM/USIM are not identical with each other, the terminal may determine that the SIM/USIM has been changed. Meanwhile, the SIM/USIM may almost never be modified out of the terminal. Therefore, it may be considered that there is no risk to skip this step before connecting with the network and reusing the information cached in the terminal during the previous session.

Whether the synchronization mechanism is available or not may be indicated from the SIM/USIM to the terminal. That is, when the synchronization mechanism is available on the SIM/USIM, it may be indicated to the terminal by the SIM/USIM service table so that the terminal is aware of availability of the synchronization mechanism. The SIM/USIM service table, i.e. $EF_{UST}$, indicates which services are available. The SIM/USIM service table should be read by the terminal as early as possible. If a service is not indicated as available in the USIM, the terminal shall not select this service. Table 1 shows a structure of $EF_{UST}$, and Table 2 shows a list of services indicated by $EF_{UST}$.

TABLE 1

| Identifier: '6F38' | Structure: transparent | Mandatory |
|---|---|---|

| SFI: '04' | |
|---|---|
| File size: X bytes, (X ≥ 1) | Update activity: low |
| Access Conditions: | |

| READ | PIN |
|---|---|
| UPDATE | ADM |
| DEACTIVATE | ADM |
| ACTIVATE | ADM |

| Bytes | Description | M/O | Length |
|---|---|---|---|
| 1 | Services n° 1 to n° 8 | M | 1 byte |
| 2 | Services n° 9 to n° 16 | O | 1 byte |
| 3 | Services n° 17 to n° 24 | O | 1 byte |
| 4 | Services n° 25 to n° 32 | O | 1 byte |
| etc. | | | |
| X | Services n° (8X-7) to n° (8X) | O | 1 byte |

TABLE 2

| | Services Contents: |
|---|---|
| Service n° 1: | Local Phone Book |
| Service n° 2: | Fixed Dialling Numbers (FDN) |
| Service n° 3: | Extension 2 |
| Service n° 4: | Service Dialling Numbers (SDN) |
| Service n° 5: | Extension3 |
| Service n° 6: | Barred Dialling Numbers (BDN) |
| Service n° 7: | Extension4 |
| Service n° 8: | Outgoing Call Information (OCI and OCT) |
| Service n° 9: | Incoming Call Information (ICI and ICT) |
| Service n° 10: | Short Message Storage (SMS) |
| Service n° 11: | Short Message Status Reports (SMSR) |
| Service n° 12: | Short Message Service Parameters (SMSP) |
| Service n° 13: | Advice of Charge (AoC) |
| Service n° 14: | Capability Configuration Parameters 2 (CCP2) |
| Service n° 15: | Cell Broadcast Message Identifier |
| Service n° 16: | Cell Broadcast Message Identifier Ranges |
| Service n° 17: | Group Identifier Level 1 |
| Service n° 18: | Group Identifier Level 2 |
| Service n° 19: | Service Provider Name |
| Service n° 20: | User controlled PLMN selector with Access Technology |
| Service n° 21: | MSISDN |
| Service n° 22: | Image (IMG) |
| Service n° 23: | Support of Localised Service Areas (SoLSA) |
| Service n° 24: | Enhanced Multi-Level Precedence and Pre-emption Service |
| Service n° 25: | Automatic Answer for eMLPP |
| Service n° 26: | RFU |
| Service n° 27: | GSM Access |
| Service n° 28: | Data download via SMS-PP |
| Service n° 29: | Data download via SMS-CB |
| Service n° 30: | Call Control by USIM |
| Service n° 31: | MO-SMS Control by USIM |
| Service n° 32: | RUN AT COMMAND command |
| ... | ... |
| Service n° 103 | Powerup optimization process |

Referring to Table 2, "Service n° 103/Power optimization process", i.e. the synchronization mechanism of the present invention, is newly defined in services indicated by $EF_{UST}$.

Further, a flag which indicates whether the terminal should perform synchronization with the SIM/USIM or reload information from the SIM/USIM may be added on the SIM/USIM. That is, the flag may indicate that the terminal should perform synchronization with the SIM/USIM as soon as possible, or the flag may indicate that the terminal reloading information from the SIM/USIM for security reasons. The flag should be read by the terminal as early as possible.

Back to FIG. 4, if it is determined that if the ICCID of the previously used SIM/USIM and the ICCID of the current used SIM/USIM are identical with each other, i.e. the SIM/USIM has not been changed, in step S220, the terminal reuses the data/information of the previous session, which has been cached in the terminal. In step S221, the terminal connects with the network by using the data/information of the previous session, and after connecting with the network, in step S222, the terminal fully reloads the remaining data/information from the SIM/USIM. Further, possible adjustments may be performed in case of modification.

Meanwhile, even though it is determined that if the ICCID of the previously used SIM/USIM and the ICCID of the current used SIM/USIM are identical with each other, to secure the whole process, as soon as connecting with the network (and as soon as the user can get a correct service), then a full synchronization with the SIM/USIM may be performed.

If it is determined that if the ICCID of the previously used SIM/USIM and the ICCID of the current used SIM/USIM are not identical with each other, i.e. the SIM/USIM has been changed, in step S230, the terminal fully reloads data/information from the SIM/USIM before connecting with the network. After fully reloads data/information from the SIM/USIM, in step S231, the terminal connects with the network by using data/information reloaded from the SIM/USIM.

In step S240, the connection with the network is completed.

Figure 5:
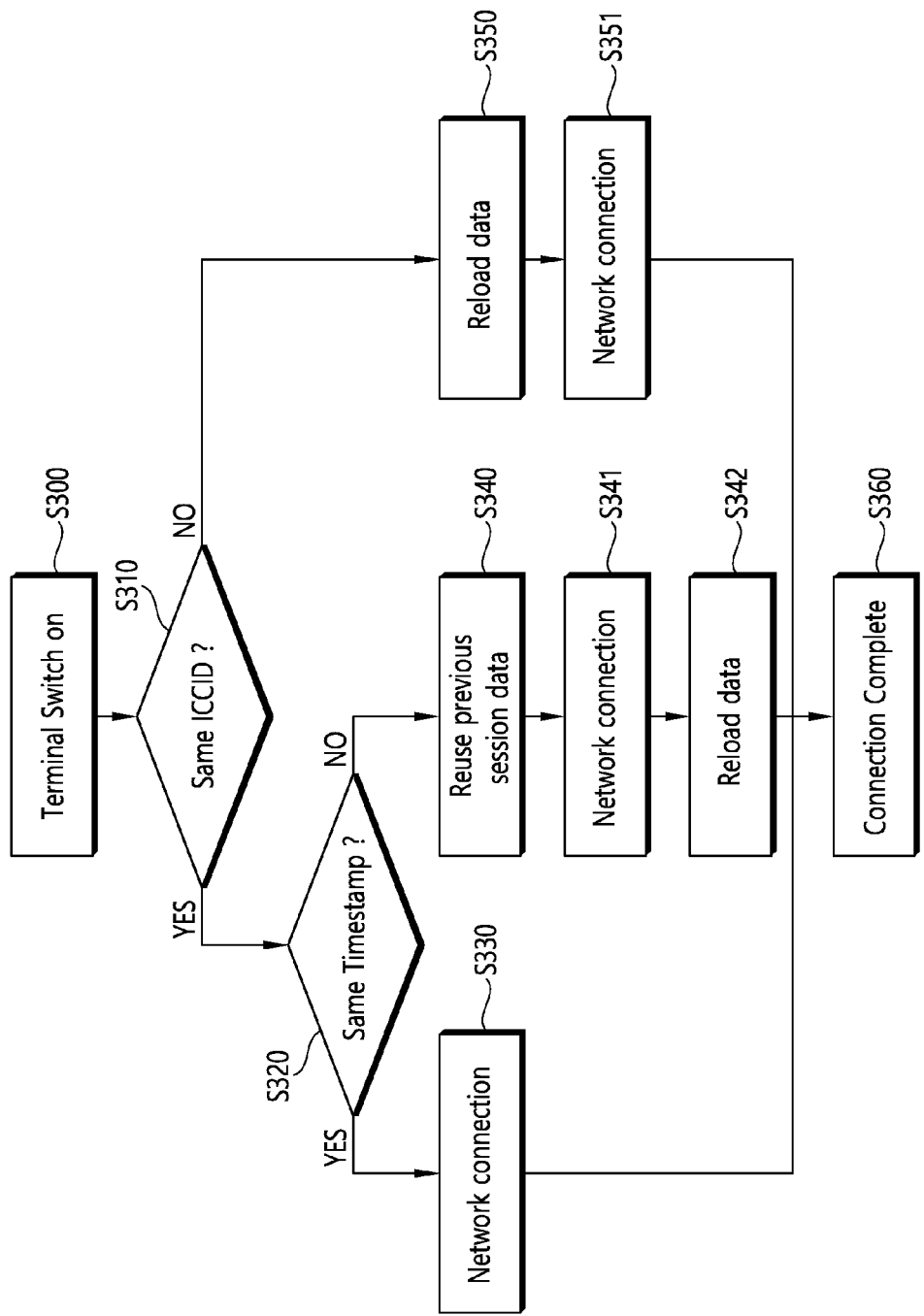
FIG. 5 shows a method for optimizing a terminal initialization process according to another embodiment of the present invention.

FIG. 5 shows a method for optimizing a terminal initialization process according to another embodiment of the present invention. In this embodiment, at first the terminal checks if the SIM/USIM has been changed, e.g. by checking a flag in the SIM/USIM, like the embodiment shown in FIG. 4. Then, if it is determined that if the ICCID of the previously used SIM/USIM and the ICCID of the current used SIM/USIM are identical with each other, i.e. the SIM/USIM has not been changed, the terminal further checks if the SIM/USIM has been modified since the last use due to the synchronization mechanism.

At first, when the terminal is switched off, information stored in the last used SIM/USIM may be stored in the terminal. That is, information stored in the last used SIM/USIM may be cached in the terminal. In order to be able to reuse information on the previous session, i.e. not to reload all information from the current SIM/USIM, all needed information shall be cached in the terminal. This has to be done in a secure way so that user cannot cheat and update this information. Among the security feature that may help, signing the whole content may significantly reduce the risk that user tries to modify his profile.

Additionally, a timestamp for data synchronization may be stored both in the terminal and in the SIM/USIM. The timestamp for data synchronization may correspond to the last time the terminal checks on the SIM/USIM. The terminal may generate the timestamp for data synchronization, and the SIM/USIM may record the same timestamp for security reasons. The SIM/USIM may update the timestamp for data synchronization on request of the terminal or delete the timestamp for data synchronization if any operation has been made on the SIM/USIM by the terminal. The timestamp for data synchronization may be updated frequently during the session and also when the terminal is switched off. Table 3 shows an example of the timestamp for data synchronization, i.e. $EF_{TimeStamp}$. This EF provides a timestamp of the last access to the mobile.

TABLE 3

| Identifier: '2FE3' | Structure: transparent | Mandatory |
|---|---|---|
| SFI: Optional | | |
| File size: 3 bytes | Update activity: low | |

Access Conditions:

| READ | PIN |
|---|---|
| UPDATE | PIN |
| DEACTIVATE | ADM |
| ACTIVATE | ADM |

| Bytes | Description | M/O | Length |
|---|---|---|---|
| 1 to 10 | Time Stamp of the last access by terminal | M | 3 bytes |

In step S300, the terminal is switched on, and in step S310, the terminal checks if the SIM/USIM has been changed by checking an ICCID of the SIM/USIM. The SIM/USIM may easily be identified by the ICCID, which is the unique serial number of the SIM/USIM. That is, if the ICCID of the previously used SIM/USIM and the ICCID of the current used SIM/USIM are identical with each other, the terminal may determine that the SIM/USIM has not been changed. Otherwise, i.e. if the ICCID of the previously used SIM/USIM and the ICCID of the current used SIM/USIM are not identical with each other, the terminal may determine that the SIM/USIM has been changed.

Whether the synchronization mechanism is available or not may be indicated from the SIM/USIM to the terminal. That is, when the synchronization mechanism is available on the SIM/USIM, it may be indicated to the terminal by the SIM/USIM service table so that the terminal is aware of availability of the synchronization mechanism. The SIM/USIM service table should be read by the terminal as early as possible. The SIM/USIM service table may follow Table 1 and Table 2 described above. Further, a flag which indicates whether the terminal should perform synchronization with the SIM/USIM or reload information from the SIM/USIM may be added on the SIM/USIM. That is, the flag may indicate that the terminal should perform synchronization with the SIM/USIM as soon as possible, or the flag may indicate that the terminal reloading information from the SIM/USIM for security reasons. The flag should be read by the terminal as early as possible.

If it is determined that if the ICCID of the previously used SIM/USIM and the ICCID of the current used SIM/USIM are identical with each other, i.e. the SIM/USIM has not been changed, in step S320, the terminal determines whether the terminal and the SIM/USIM have the same timestamp for data synchronization. If it is determined that the terminal and the SIM/USIM have the same timestamp for data synchronization, in step S330, the terminal may connect with the network directly. That is, since the terminal is certain of status of the SIM/USIM, the profile update may be skipped completely.

If it is determined that the terminal and the SIM/USIM do not have the same timestamp for data synchronization, in step S340, the terminal reuses the data/information of the previous session, which has been cached in the terminal. That is, the synchronization mechanism may be performed based on existing mechanisms such as SyncML since some information has been modified. In step S341, the terminal connects with the network by using the data/information of the previous session, and after connecting with the network, in step S342, the terminal fully reloads the remaining data/information from the SIM/USIM. Further, possible adjustments may be performed in case of modification.

If it is determined that if the ICCID of the previously used SIM/USIM and the ICCID of the current used SIM/USIM are not identical with each other, i.e. the SIM/USIM has been changed, in step S350, the terminal fully reloads data/information from the SIM/USIM before connecting with the network. That is, for the best security, the whole set of information may be reloaded. After fully reloads data/information from the SIM/USIM, in step S351, the terminal connects with the network by using data/information reloaded from the SIM/USIM.

In step S360, the connection with the network is completed.

Figure 6:
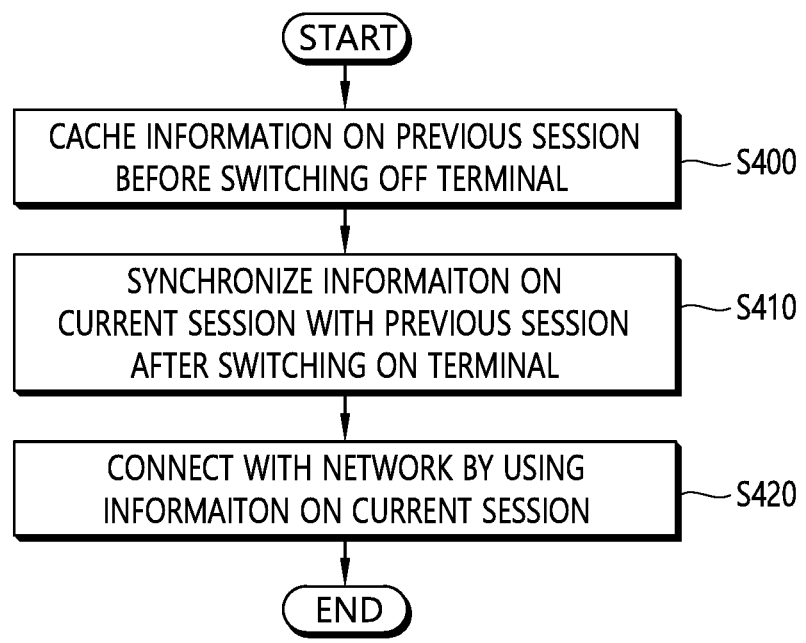
FIG. 6 shows a method for connecting with a network by a terminal according to an embodiment of the present invention.

FIG. 6 shows a method for connecting with a network by a terminal according to an embodiment of the present invention.

In step S400, the terminal caches information on a previous session before switching off the terminal. In step S410, the terminal synchronizes information on a current session with information on the previous session after switching on the terminal. In step S420, the terminal connects with the network by using the information on the current session.

The synchronizing information may include determining whether a flag of a UICC corresponding to the previous session and a flag of a UICC corresponding to the current session is identical or not. That is, the terminal may if the SIM/USIM has been changed. The flag of the UICC may be an ICCID. When it is determined that the flag of the UICC corresponding to the previous session and the flag of the UICC corresponding to the current session are identical with each other, the terminal may reuse the information on the previous session as the information on the current session, and reload data from the UICC after connecting with the network. Alternatively, when it is determined that the flag of the UICC corresponding to the previous session and the flag of the UICC corresponding to the current session are not identical with each other, the terminal may reload data from the UICC before connecting with the network.

Alternatively, when it is determined that the flag of the UICC corresponding to the previous session and the flag of the UICC corresponding to the current session are identical with each other, the terminal may determine whether a timestamp for data synchronization stored in the terminal and a timestamp for data synchronization stored in the UICC are identical with each other or not. The timestamp for data synchronization may correspond to a last time when the terminal checks on the UICC. When it is determined that the timestamp for data synchronization stored in the terminal and the timestamp for data synchronization stored in the UICC are not identical with each other, the terminal may reuse the information on the previous session as the information on the current session, and reload data from the UICC after connecting with the network.

The present invention described above may be possibly extended as follows.

(1) The terminal may store several SIM/USIM full profiles in its memory, and reinstall the correct context based on the ICCID check and the Last Used Date comparison.

(2) There may be a warning sign which indicates to the user that connection with the network is ok, but data are still synchronizing. Even in this case, calls (including emergency calls) may be done without problem.

(3) Information on the profile may be stored in the cloud to allow possible reuse in various terminals. This possibility may be of a lower interest as this implies a very efficient mean to download this information from the cloud (quicker than getting it from the SIM/USIM).

Figure 7:
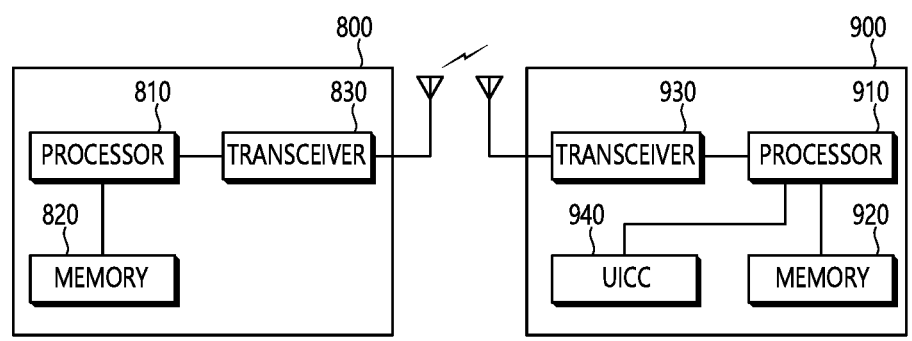
FIG. 7 shows a wireless communication system to implement an embodiment of the present invention.

FIG. 7 shows a wireless communication system to implement an embodiment of the present invention.

An entity of a network 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A terminal 900 may include a processor 910, a memory 920, a transceiver 930, and a UICC 940. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910 and a set of authentication credentials. The transceiver 930 is operatively coupled with the processor 910, and transmits and/or receives a radio signal. The UICC 940 is operatively coupled with the processor 910, and stores a variety of information for terminal initialization process.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

The present invention described above enables the user to access to both the terminal and the network in a much shorter timeframe. Therefore, the user experience can be enhanced without reducing the service offered. The information can always be synchronized. Further, security related features can be enforced in priority, still before any action can be done on the network. Further, Security can even be enhanced compared to the current implementation that stores the PIN code in the terminal in case of automatic terminal reboot.

The advantages and drawbacks of different options of the present invention are listed in Table 4, compared to the current procedure.

TABLE 4

| | Time reduction | Security | User experience |
|---|---|---|---|
| Current procedure | – | +++ | – |
| Option 1 (FIG. 4) | ++ | + | ++ |
| Option 2 (FIG. 4) | + | ++ | + |

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for connecting with a network by a terminal in a wireless communication system, the method comprising:
  caching information on a previous session before switching off the terminal;
  synchronizing information on a current session with information on the previous session after switching on the terminal; and connecting with the network by using the information on the current session, wherein synchronizing information comprises:

determining whether a flag of a universal integrated circuit card (UICC) corresponding to the previous session and a flag of a UICC corresponding to the current session are identical with each other, wherein when it is determined that the flag of the UICC corresponding to the previous session and the flag of the UICC corresponding to the current session are identical with each other, determining whether a timestamp for data synchronization stored in the terminal and a timestamp for data synchronization stored in the UICC are identical with each other, and wherein when it is determined that the timestamp for data synchronization stored in the terminal and the timestamp for data synchronization stored in the UICC are not identical with each other, reusing the information on the previous session as the information on the current session.

2. The method of claim 1, wherein the flag of the UICC is an integrated circuit card identity (ICCID).

3. The method of claim 1, wherein when it is determined that the flag of the UICC corresponding to the previous session and the flag of the UICC corresponding to the current session are identical with each other, reusing the information on the previous session as the information on the current session.

4. The method of claim 3, further comprising:

reloading data from the UICC after connecting with the network.

5. The method of claim 1, wherein when it is determined that the flag of the UICC corresponding to the previous session and the flag of the UICC corresponding to the current session are not identical with each other, reloading data from the UICC before connecting with the network.

6. The method of claim 1, wherein the timestamp for data synchronization corresponds to a last time the terminal checked on the UICC.

7. The method of claim 1, further comprising:

reloading data from the UICC after connecting with the network.

8. A terminal in a wireless communication system, the terminal comprises:

a memory;
a transceiver;
a universal integrated circuit card (UICC); and
a processor coupled to the memory, the transceiver and the UICC, that:

caches information on a previous session in the memory before switching off the terminal, synchronizes information on a current session with information on the previous session after switching on the terminal, and connects with the network by using the information on the current session, wherein synchronizing information comprises:

determining whether a flag of the UICC corresponding to the previous session and a flag of a UICC corresponding to the current session are identical with each other, wherein when it is determined that the flag of the UICC corresponding to the previous session and the flag of the UICC corresponding to the current session are identical with each other, the processor further determines whether a timestamp for data synchronization stored in the terminal and a timestamp for data synchronization stored in the UICC are identical with each other, and wherein when it is determined that the timestamp for data synchronization stored in the terminal and the timestamp for data synchronization stored in the UICC are not identical with each other, the processor further reuses the information on the previous session as the information on the current session.

9. The terminal of claim 1, wherein the flag of the UICC is an integrated circuit card identity (ICCID).

10. The terminal of claim 1, wherein when it is determined that the flag of the UICC corresponding to the previous session and the flag of the UICC corresponding to the current session are identical with each other, the processor further reuses the information on the previous session as the information on the current session.

11. The terminal of claim 10, wherein the processor further reloads data from the UICC after connecting with the network.

12. The terminal of claim 1, wherein when it is determined that the flag of the UICC corresponding to the previous session and the flag of the UICC corresponding to the current session are not identical with each other, the processor further reloads data from the UICC before connecting with the network.

13. The terminal of claim 1, wherein the timestamp for data synchronization corresponds to a last time the terminal checked on the UICC.

14. The terminal of claim 1, wherein the processor further reloads data from the UICC after connecting with the network.

* * * * *